April 26, 1932. A. F. VICTOR 1,855,268

FILM TENSION CONTROL

Filed July 18, 1929  2 Sheets-Sheet 1

Inventor:
Alexander Ferdinand Victor
By E. K. Lundy
Atty.

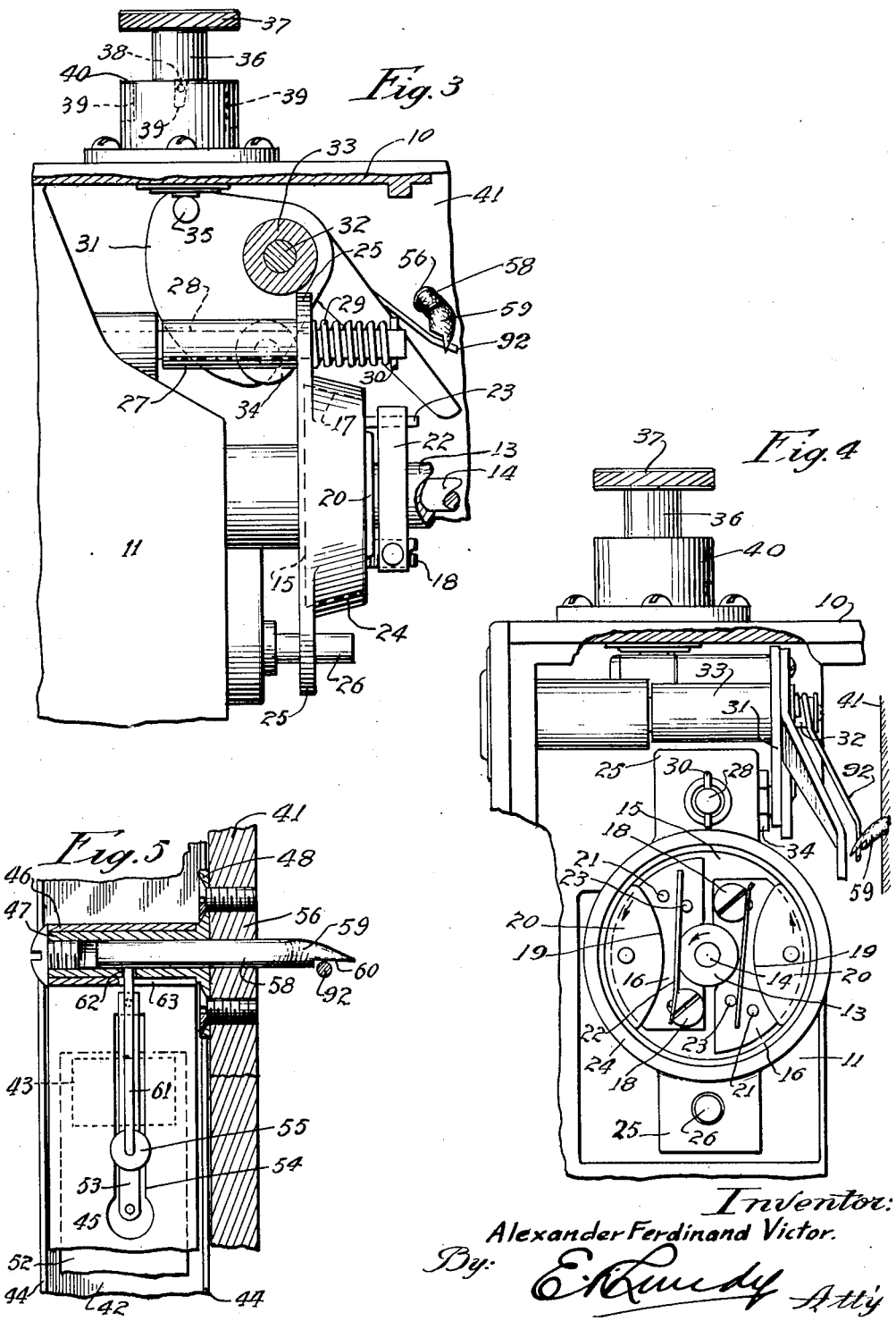

Patented Apr. 26, 1932

1,855,268

UNITED STATES PATENT OFFICE

ALEXANDER FERDINAND VICTOR, OF NEW YORK, N. Y.

FILM TENSION CONTROL

Application filed July 18, 1929. Serial No. 379,305.

My present invention relates to cinematographic apparatus and it has more particular reference to the automatic control of the film as it travels through the guide-way or passageway in its movement past the aperture and the feed or advancing mechanism. The improvements are herein shown, merely for the purpose of illustration, as installed in a motion-picture camera, although it will be understood that the principles may be readily embodied in other apparatus, such, for example, as projectors, printers, reeling devices, and rewinders, and I therefore do not limit my claims to any particular type of apparatus in connection with which my improved automatic control may be used.

It is usually the custom, where the film is fed through a guide-way or passageway, to provide a friction plate or presser-foot that yieldably bears against one of the surfaces of the film to maintain the latter in its position of momentary rest while the shuttle or film advancing devices change to the succeeding position to engage the film. The plate or foot just mentioned is usually spring-urged against the film and the friction or pressure is constant, and means are sometimes provided to manually tighten or loosen the spring in the event there is too much or not enough friction, due to the devices getting out of adjustment, but to tighten or loosen the spring it is necessary to open the camera, projector or other apparatus as the parts are usually not accessible from the exterior. With the camera or printer this is impossible while the apparatus is loaded with the film because the sensitized film becomes "light-struck" when exposed. In apparatus where provision is made to adjust the tension on the film from the exterior it is usually necessary to arrest the advance of the film and then make the adjustment manually. Furthermore, cameras are operated at normal speed for ordinary photography and at a faster or ultra-speed for "slow-motion" photography and in some cameras a simple adjustment will change the speed as desired. Where the film advancing devices are moving at ultra-speed there is more of a tendency of the film to slip and the tension on the film in the guide or passageway should therefore be greater than at normal speed.

My present structure provides simple means which automatically increases the tension on the film according to the increase in speed of the film feeding devices and it automatically decreases the tension as the speed of the feed devices is reduced. Thus it is unnecessary for the operator to give any attention to the friction plate or tension device while operating the film or when changing from one speed to another. My automatic control devices are readily adaptable to the small cameras and projectors for amateur use because of its simplicity and compactness, and its parts are novel in construction and arrangement as well as dependable in operation.

I prefer to carry out my invention and to accomplish the numerous objects thereof in substantially the manner hereinafter fully described and as more particularly pointed out in the claims, reference being herein made to the accompanying drawings that form a part of this specification.

In the drawings:

Figure 3 is a side elevation of a portion of a speed-controlled mechanism showing a portion of my frictional tensioning device, and drawn to an enlarged scale for clearness.

Figure 4 is a front elevation of the structure shown in Figure 3 looking at the same from the right-hand side thereof.

Figure 5 is a vertical section taken on line 5—5 of Figure 1, looking in the direction indicated by the arrows and drawn to an enlarged scale.

The drawings are more or less schematic for the purpose of disclosing a typical or preferred form of my invention and I have employed similar reference characters to identify like parts wherever they appear throughout the several views.

Figure 1:
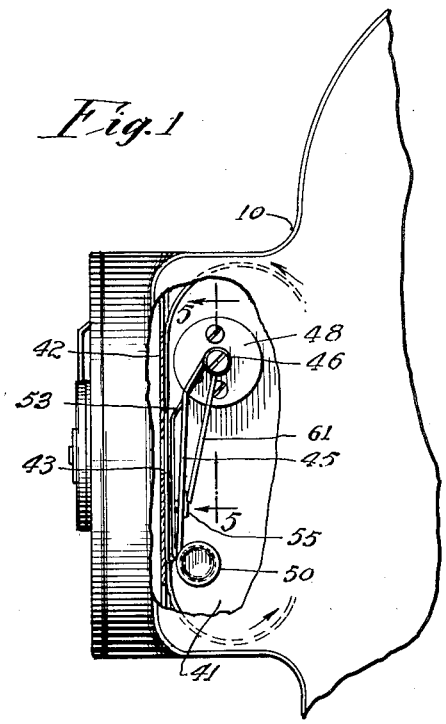
Figure 1 is a side elevation of the front portion of a motion-picture camera with the casing broken away to disclose an embodiment of my invention, part of the film guideway being in section.
Figure 2:
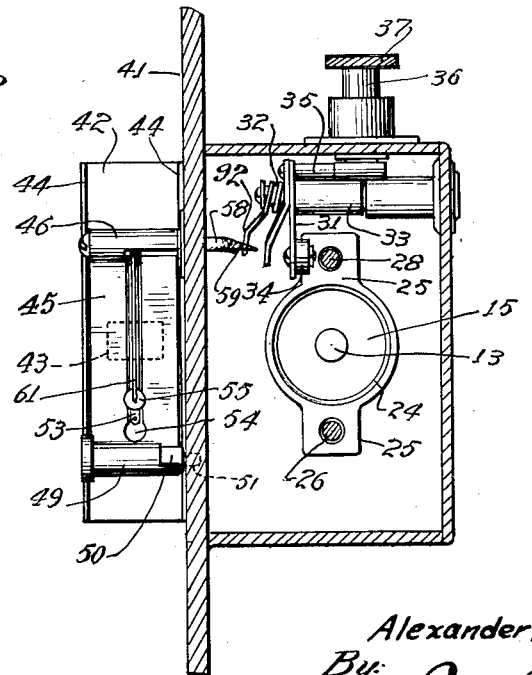
Figure 2 is a vertical section of the camera casing and looking at the back of the structure shown in Figure 1 and drawn to an enlarged scale.

The housing or casing of the camera includes a horizontal top wall 10 and below the same is an irregularly shaped casting 11 that provides a mounting for a portion of the moving mechanism that controls the advance of the film. The automatic power mechanism, which is not shown, is in the form of a heavy coiled clock-spring and suitable clockwork connected therewith that actuates the film engaging elements and the shutter. These film engaging elements and the shutter structure are not shown, but they may be of any suitable type such as disclosed in the subject-matter of my co-pending application filed January 21, 1929, Serial Number 334,069 for a Motion picture apparatus.

Due to the fact that the clock-spring and clockwork, unless properly controlled would advance the film at a too rapid speed I have provided a controlling brake mechanism that is connected with the film engaging member in order that the speed of the film may be under the positive control of the operator. There is a horizontal rotatable member or sleeve 13 that is mounted upon the end of a stud 14 projecting forwardly from the casting 11 of the camera casing and the outer end of this sleeve has connection with and derives its motion through gearing forming a portion of the film engaging mechanism. The inner end of the sleeve opposite the gearing is flanged laterally to provide a mount or carrier disk 15 for a portion of the governor or brake mechanism. This may be termed the movable portion of the brake, and it consists of a plurality or a pair of shoes 16 that are semi-circular or have segmental outer portions, the surfaces of which are tapered and formed on a cone as indicated at 17 (Fig. 3), and said shoes are pivotally mounted on the disk 15 by means of shouldered screw pins 18 that are screwed into the disk after passing through smooth holes in the shoes to permit of their pivotal movement. The shoes are provided with pockets 19 extending inwardly from their segmental tapered edges in which fillers 20 of leather or the like are placed and secured by rivets or otherwise so that friction members are provided that co-operate with the annulus or ring hereinafter described. Thus, when the sleeve is rotated in the direction indicated by the arrows in Fig. 4 these shoes due to centrifugal action, will also swing bodily on their pivots 18 in a direction laterally away from the sleeve and a too great a movement in this lateral direction is prevented or limited by means or stops or pins 21 that project from the shoes into larger openings made in the disk on which the shoes are pivoted. For the purpose of retarding this outward swing of the shoes to some extent and to insure their positive return to normal positions, springs 22 are mounted laterally on the pivot pins 18 and extend towards the opposite ends of the shoes where they yieldably bear against projections 23, thus urging the shoes into their normal positions.

There is a clutch or brake-ring 24 that coacts with and normally engages the outer conical surfaces of the shoes, the interior surface of which ring is tapered to approximately the same angle as the outer or friction surfaces of the shoes, so that the ring may be said to be of a frustum-conical shape. Apertured ears 25 project radially from diametrically opposite portions of the ring, the lower ear being engaged with a guide 26 that passes through the aperture in said ear, while the other or upper ear is provided with a tubular extension 27 at its aperture that is slidably and telescopically mounted upon a guide 28 arranged parallel with the lower guide and projects from the casting 11. A coiled expansion spring 29 surrounds the extended portion of guide 28 between the adjacent ear and a stop-pin 30 driven through the outer portion of the guide, so that the clutch ring is thus normally urged towards the supporting casting 11 from which the guides project. This normally maintains the ring in intimate frictional contact with the shoes, and this friction is sufficient to overcome any tendency of the sleeve 13 and its connected parts to move, and will consequently prevent any movement of the film-feeding devices that may be due to the urge of the main power spring and associated clockwork. When the clutch ring is slid on its guides against the spring 29 which is towards the outer end of the sleeve 13, the shoes 16 will be correspondingly released and the friction between the ring and the shoes will be reduced in proportion to the distance the ring is slid so that the sleeve 13 will rotate faster as the friction is decreased.

The speed at which the parts move depends upon the intervening space between the edges of the shoes and the internal surface of the ring, so that when the ring is moved even a slight distance the sleeve will begin to rotate but it cannot attain its highest speed because the shoes will be thrown out centrifugally and will drag against the ring thus maintaining a uniform predetermined speed in this position. Further outward adjustment of the ring will permit the movable parts to travel faster because the friction between the shoes and the rings becomes less and the centrifugal action of the shoes will be against the retarding springs 22 which to some extent prevents their coming into intimate contact with the ring, but with just enough friction to prevent too free movement of the sleeve. It is also possible to slide the ring to a position where the shoes may not contact the ring due to the fact that the stops 21 limit their outward or pivotal movement and under such conditions the sleeve will revolve freely without interference from the ring, which is the ultra-speed desired for slow motion photography.

The various positions of the ring 24 are attained by means of a cam 31 in the form of a bell-crank fulcrumed at one corner upon a pivot 32 and has an elongated bearing 33 surrounding the pivot. A roller 34, mounted on the lower corner of the cam, has its edge engaging the adjacent rear surface of the adjacent upper ear 25 of the ring and on the side opposite the spring 29. There is a projection or pin 35 on the cam that is engaged by the lower end of a depressible, automatically returnable plunger 36 that extends through and has a bearing in the top wall 10 of the housing, and for convenience the upper end of the plunger is formed into a head 37 that is provided with an indicator upon its top surface to coact with a scale on the housing to ascertain the rotative position of the plunger. The extent of downward movement of the plunger determines or control the extent of movement of the ring 24 and this movement is limited by a pin 38 projecting laterally from the plunger into any one of a plurality of slots 39 in the bearing bushing 40 that surrounds the plunger. The slots 39 are of different depths so that by positioning the pin 38 in a selected slot and then depressing the plunger the desired speed may be obtained.

Extending longitudinally within the camera casing is a vertical partition 41 that separates the motor elements of the structure from the photographing elements, and alongside the partition adjacent the front end thereof is the film-passageway or guideway that includes a vertical elongated plate 42 that is commonly known as the "aperture element" by reason of the fact that it is provided with the rectangular opening or window 43, through which the successive pictures are made on the film. This plate or aperture element is provided with guide flanges or ribs 44 that extend inwardly along its marginal edges and are spaced apart a distance sufficient to receive the ribbon of film between them and guide the latter in its movement past the light aperture or window 43. Coacting with the aperture plate is a swinging gate in the form of a plate 45 the upper end of which is rounded into a cylindrical knuckle 46 to mount it upon a hollow stud 47 projecting from a screw plate 48 that is secured to the adjacent portion of the partition 41, and said knuckle is maintained against longitudinal displacement by the head of a slot screw that is screwed into the outer end of the bore of the hollow spindle 47 (Fig. 5). The lower end of the gate plate is rounded into a cylindrical housing 49 for the barrel of a retractable headed latch pin 50 that coacts with a recess 51 in the partition to maintain the gate plate 45 in proper relation to guide-plate 42. This arrangement permits the pin to be withdrawn from its recess 51 so that the gate-plate may be swung upon its pivot 47 away from the apertured guide plate while the film is being threaded in the guide passageway formed by these cooperating plates. In order to permit a yielding pressure being exerted upon the film while it is in the guide passageway, I have provided a presser-foot or presser-plate 52 that is of any suitable formation and is mounted upon the lower portion of a small flat spring 53 that yieldably urges the foot towards the apertured guide-plate 42 and consequently frictionally presses the film towards the latter. The upper end of the spring 53 is secured to the face of the gate plate 45 that is away from the guide-passageway so that the intermediate portion of said spring passes through the gate plate in a slot 54 extending longitudinally of said gate plate. A pin, having a large plate head 55, extends from the spring or presser foot so that its shank is in the slot 54 and its head is upon the opposite side of the gate plate 45 in the manner shown in Figures 1 and 5.

This hollow spindle alines with a hole 56 in partition 41 that afford bearings for a small rock-spindle or crank 58 that projects at one end beyond the partition where it is provided with an obliquely curved end 59 that is shouldered on its underside as at 60, while adjacent its opposite end said rock-spindle 58 has a laterally extending finger 61 (preferably a length of spring wire) that projects through a transverse or annular slot 62 in the hollow spindle 47 and a wide longitudinal slot 63 in the knuckle 46 of the gate plate. The movable end of the finger 61 is adapted to swing into engagement with the head 55 of the pin that projects from the presser members and when the rock spindle 58 is moved in the proper direction the finger 61 will urge the presser foot against the film in the guide passageway to a greater degree than the flat spring 53 on which the foot is yieldably mounted.

The crank or curved end 59 of the rock spindle is engaged at its shouldered portion 60 by the end of a spring wire 92, extending from the end of the pin 32 that pivots the cam or bell crank 31 to control the speed regulating devices hereinbefore described. Thus when the plunger 36 is depressed the proper distance to release the feed control governor or brake, the wire arm 92 will operate the end 59 of the rock-spindle to rock the latter, which causes the spring member 61 to bear upon the pin-head 55 and increase the pressure on presser-foot 52. The farther the plunger 36 is depressed the faster the feed mechanism moves the film due to the controlling action of the brake or governor, and consequently the greater will be the pressure of the spring member 61 upon the presser-foot to increase the friction between elements of the guide passageway and the film. This arrangement places the pressure or friction in the guide passageway under the influence of the elements that control the speed of movement of the film and, as this coordination is such that their operation is automatic, it is not necessary for the operator to concern himself with the same at any time no matter at what speed he desires to operate the film feed. In order to give the spring member or finger 92 the desired resiliency its end is wound or coiled upon the adjacent extended end of spindle 32 before it is anchored thereto.

Other means than that shown may be utilized to coordinate the feed control elements with the presser-foot so as to automatically control the friction against the film in proportion to the speed of the movement of the film, and in this connection I contemplate the employment of a centrifugal device or governor that may be actuated by the drive mechanism and as this governor operates at the different speeds of the film it will automatically regulate the pressure or friction on the latter in the desired manner. I believe that I am the first to provide this automatic control of pressure on the film, and I therefore desire it understood that I claim this improvement in its broadest aspect. The foregoing detailed description and drawings have been given for the purpose of clearness of understanding only, and no unnecessary limitations should be understood therefrom.

What I claim is:

1. A device of the kind described comprising devices for feeding the film, a governor interposed in said feeding devices for controlling the speed of movement of the film, means for adjusting said governor to permit predetermined speed of movement of the film, variable tension means normally urged towards the film, and automatic devices operatively connected with said governor adjusting means for varying said tension means to increase the tension in proportion to an increase in speed and vice-versa.

2. A device of the kind described comprising film feeding devices, means for changing the speed thereof to definite velocities, and tensioning mechanism engaged with the film consisting of opposed friction plates between which the film is moved, one of said plates being yieldable, a rock-spindle actuated by the speed changing means, and an element extending from said spindle into coaction with the yielding friction plate whereby to alter the tension upon the film whenever the speed is changed.

3. In motion picture apparatus a pair of opposing plates providing a passageway through which film is moved, a yieldable presser-foot mounted on one of said plates and normally engaged with the film in the passage-way, a rock-spindle, a spring arm extended from said spindle and yieldably engaged with said presser-foot, in combination with film feeding devices, and control mechanism adapted to release the feeding devices to move the film at variable speeds, a portion of said mechanism arranged to actuate said rock-spindle to and thereby alter the friction on the film in proportion to the speed of the feeding devices.

4. Motion picture apparatus comprising a film passageway, feed devices for moving film therethrough, control mechanism connected to said feed devices for adjusting the latter to several definite speeds, yieldable tension means effective on the film in said passageway, and means operated by the control mechanism and engaged with said tension means to cause the latter to increase or diminish the tension on the film during a respective increase or diminution of speed.

5. Motion picture apparatus comprising a film passageway, feed devices for moving film therethrough, control mechanism connected to said feed devices for adjusting the latter to several definite speeds, yieldable tension means effective on the film in said passageway, a rockable member operatively connected to said control mechanism whereby said member is operated when the speed is changed, and means connecting said member to said tension means.

6. Motion picture apparatus comprising a film passageway, feed devices for moving film therethrough, control mechanism connected to said feed devices for adjusting the latter to several definite speeds, yieldable tension means effective on the film in said passageway, a rock-spindle having a lateral end that extends into the path of movement of a portion of said control mechanism, and means connecting said spindle to said tension means to cause the latter to increase or diminish the tension on the film during a respective increase or diminish of speed.

7. Motion picture apparatus comprising a film passageway, feed devices for moving film therethrough, a drive-shaft for actuating said devices, a brake for controlling the speed of said shaft, a bell-crank coacting with said brake, a plunger engaged with said bell-crank and movable to different predetermined positions whereby to permit the shaft to move at definite selected speeds, a yieldable tension device effective upon the film in said passageway, and a device actuated by said bell-crank and having connection with said tension device to cause the latter to increase or diminish tension on the film during a respective increase or diminution of speed.

8. Motion picture apparatus comprising a film passageway, feed devices for moving film therethrough, a drive-shaft for actuating said devices, a brake for controlling the speed of said shaft, a bell-crank coacting with said brake, a plunger engaged with said bell-crank and movable to different predetermined positions whereby to permit the shaft to move at definite selected speeds, a yieldable tension device effective upon the film in said passageway, a rockable member operatively connected to said bell-crank whereby said member is operated when the speed is changed, and means connecting said member to said tension means.

9. Motion picture apparatus comprising a film passageway, feed devices for moving film therethrough, a drive-shaft for actuating said devices, a brake for controlling the speed of said shaft, a bell-crank coacting with said brake, a plunger engaged with said bell-crank and movable to different predetermined positions whereby to permit the shaft to move at definite selected speeds, a yieldable tension device effective upon the film in said passageway, a rock-spindle having a lateral end that extends into the path of movement of a portion of said bell-crank, and means connecting said spindle to said tension means to cause the latter to increase or diminish tension on the film during a respective increase or diminution of speed.

10. A motion picture device of the kind described comprising a film guide passageway through which film is fed by a drive mechanism, a governor for controlling the speed of said drive mechanism, manually operated devices for adjusting said governor to different speeds, yieldable tension devices engaged with the film, and means connecting said tension devices to said manually operated adjusting devices whereby the tension on the film is modified relative to the adjusted speed of said governor.

11. A motion picture device of the kind described comprising a film guide passageway through which film is fed by a drive mechanism, a governor for controlling the speed of said drive mechanism, manually operated devices for adjusting said governor to different speeds, a movable plate engaged with the film in said passageway, yieldable tension devices engaged with the plate, and means connecting said tension devices to said manually operated adjusting devices whereby the tension on the film is modified relative to the adjusted speed of said governor.

12. A motion picture device of the kind described comprising a film guide passageway through which film is fed by a drive mechanism, a governor for controlling the speed of said drive mechanism, manually operated devices for adjusting said governor to different speeds, yieldable tension devices urged towards said passageway against the film therein, and means connecting said tension devices to said manually operated adjusting devices whereby the tension on the film is modified relative to the adjusted speed of said governor.

13. A motion picture device of the kind described comprising a film guide passageway through which film is fed by a drive mechanism, control means connected with said drive mechanism and including a manually operated structure that is movable to different positions to regulate the speed of said drive mechanism, and yieldable tension devices engaged with the film and having connection with said manually operated structure where the tension is regulated according to the relative position of said manually operated structure.

14. A motion picture device of the kind described comprising a film guide passageway through which film is fed by a drive mechanism, control means connected with said drive mechanism and including a manually operated structure that is movable to different positions to regulate the speed of said drive mechanism, a movable plate engaged with the film in said passageway, and yieldable tension devices engaged with the plate and having connection with said manually operated structure where the tension is regulated according to the relative position of said manually operated structure.

15. A motion picture device of the kind described comprising a film guide passageway through which film is fed by a drive mechanism, control means connected with said drive mechanism and including a manually operated structure that is movable to different positions to regulate the speed of said drive mechanism, and yieldable tension devices urged towards said passageway against the film therein and having connection with said manually operated structure where the tension is regulated according to the relative position of said manually operated structure.

16. A motion picture device of the kind described comprising a film guide passageway through which film is fed by a drive mechanism, an adjustable governor connected with the drive mechanism, adjustable yielding tension devices engaged with the film, and common manually operated means for simultaneously adjusting said governor and said tension devices whereby the tension on the film is regulated relative to the speed of the drive mechanism.

Signed at Davenport, in the county of Scott, and State of Iowa, this 5th day of May, 1929.

ALEXANDER FERDINAND VICTOR.